United States Patent
Yui et al.

(10) Patent No.: US 11,370,682 B2
(45) Date of Patent: Jun. 28, 2022

(54) WATER TREATMENT METHOD AND WATER TREATMENT APPARATUS

(71) Applicant: ORGANO CORPORATION, Tokyo (JP)

(72) Inventors: Hironori Yui, Tokyo (JP); Taichi Yamamoto, Tokyo (JP); Masaki Miyake, Tokyo (JP); Yoshiaki Hasebe, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 0 days.

(21) Appl. No.: 17/253,355

(22) PCT Filed: Jun. 20, 2019

(86) PCT No.: PCT/JP2019/024447
§ 371 (c)(1),
(2) Date: Dec. 17, 2020

(87) PCT Pub. No.: WO2019/244969
PCT Pub. Date: Dec. 26, 2019

(65) Prior Publication Data
US 2021/0261450 A1    Aug. 26, 2021

(30) Foreign Application Priority Data

Jun. 22, 2018 (JP) .............................. JP2018-118620

(51) Int. Cl.
*C02F 3/34* (2006.01)
*C02F 3/28* (2006.01)
*C02F 101/16* (2006.01)

(52) U.S. Cl.
CPC .............. *C02F 3/34* (2013.01); *C02F 3/2806* (2013.01); *C02F 2101/163* (2013.01); *C02F 2101/166* (2013.01); *C02F 2305/06* (2013.01)

(58) Field of Classification Search
CPC .... C02F 3/34; C02F 3/2806; C02F 2101/163; C02F 2101/166; C02F 2305/06; C02F 3/305; Y02W 10/10

(Continued)

(56) References Cited

U.S. PATENT DOCUMENTS

| 2006/0191846 A1 | 8/2006 | Sumino et al. |
| 2014/0367333 A1* | 12/2014 | Razavi-Shirazi ......... C02F 3/00 210/615 |

FOREIGN PATENT DOCUMENTS

| JP | 2004-74111 A | 3/2004 |
| JP | 2006-272287 A | 10/2006 |

(Continued)

OTHER PUBLICATIONS

Kraft, B. et al., "Microbial nitrate respiration—Genes, enzymes and environmental distribution", Journal of Biotechnology, 2011, pp. 104-117.

(Continued)

*Primary Examiner* — Fred Prince
(74) *Attorney, Agent, or Firm* — Greenblum & Bernstein, P.L.C.

(57) ABSTRACT

Provided are: a water treatment method that includes at least a denitrification step for denitrifying water to be treated with a denitrifying bacterium in the presence of a hydrogen donor, wherein the denitrification activity of the denitrifying bacterium can be maintained at a high level and thus the treatment speed can be increased; and a water treatment apparatus. The water treatment method includes at least a denitrification step for passing water to be treated through a biological treatment tank and denitrifying the same with a heterotrophic denitrifying bacterium in the presence of a hydrogen donor, wherein: molybdenum is added to the water to be treated to give a concentration of 0.01-1.0 mgMo/gN; a carrier is added to the biological treatment tank; and the nitrogen load to the carrier is controlled to 1.6 kgN/(m³-carrier·d) or greater.

4 Claims, 8 Drawing Sheets

(58) Field of Classification Search
USPC ....... 210/611, 615, 616, 617, 630, 252, 259, 210/903
See application file for complete search history.

(56) References Cited

FOREIGN PATENT DOCUMENTS

| | | |
|---|---|---|
| JP | 3933009 B2 | 3/2007 |
| JP | 2010-253352 A | 11/2010 |
| JP | 2012-66164 A | 4/2012 |
| KR | 10-2013-0001189 A | 1/2013 |
| KR | 10-2017-0132429 A | 12/2017 |

OTHER PUBLICATIONS

Notice of Reasons for Refusal (Office Action) issued in Japan Patent Application No. 2018-118620, dated Oct. 11, 2018, along with an English translation thereof.
Notice of Reasons for Refusal (Office Action) issued in Japan Patent Application. No. 2018-118620, dated Aug. 2, 2018, along with an English translation thereof.
International Search Report issued in International Patent Application No. PCT/JP2019/024447, dated Aug. 20, 2019, along with an English Translation thereof.
Written Opinion of the International Searching Authority issued in International Patent Application No. PCT/JP2019/024447, dated Aug. 20, 2019, along with an English Translation thereof.
Notification Concerning Transmittal of International Preliminary Report of Patentability (Chapter I of the Patent Cooperation Treaty) issued in International Patent Application No. PCT/JP2019/024447, dated Dec. 30, 2020 along with an English Translation thereof.
Notification of Transmittal of Translation of the International Preliminary Report of Patentability (Chapter I and Chapter II) issued in International Patent Application No. PCT/JP2019/024447, dated Dec. 30, 2020 along with an English Translation thereof.
Office Action issued in Indian Patent Application No. 202017054448 dated Mar. 16, 2021, along with English Translation thereof.

\* cited by examiner

WATER TREATMENT METHOD AND WATER TREATMENT APPARATUS

CROSS REFERENCE TO RELATED APPLICATION

This application claims priority to Japanese Patent Application No. 2018-118620 filed on Jun. 22, 2018, which is incorporated herein by reference in its entirety including the specification, claims, drawings, and abstract.

TECHNICAL FIELD

The present disclosure relates to a water treatment method that includes at least a denitrification step of subjecting a water to be treated to a denitrification treatment by denitrifying bacteria in the presence of a hydrogen donor, and a water treatment apparatus.

BACKGROUND

By subjecting at least one of nitrate nitrogen and nitrite nitrogen in a water to be treated to a denitrification treatment by denitrifying bacteria in the presence of a hydrogen donor, the at least one of nitrate nitrogen and nitrite nitrogen can be decomposed to obtain nitrogen gas. These types of denitrification methods are classified as flotation methods, USB (Upflow Sludge Blanket) methods or carrier methods depending on the manner in which the denitrifying bacteria are held. In the following description, unless specifically stated otherwise, the term "denitrifying bacteria" means heterotrophic denitrifying bacteria that cause denitrification in the presence of a hydrogen donor.

Among the denitrification methods described above, flotation methods in which the sludge is returned from a settling pond are widely used, but because operation is conducted under a low nitrogen loading of not more than 1 $kg/(m^3 \cdot d)$, the reaction tank volume required for treatment is large.

In contrast, the USB method is a method in which granules having favorable settling properties are formed in the reaction tank by self-granulation utilizing the aggregation properties of the denitrifying bacteria, and the water to be treated undergoes a denitrification treatment by passage along an upward flow. In this method, as a result of the granules having favorable settling properties, a large amount of the denitrifying bacteria can be held inside the reaction tank, and therefore compared with flotation methods, treatment under higher loading is possible.

Further, with the carrier method (fixed bed or fluid bed) in which a microorganism-holding carrier is used to hold a high concentration of denitrifying bacteria on the carrier, operation under higher loading than the flotation method is possible, and because a sludge that has undergone solid-liquid separation in the settling pond need not be returned, operation and maintenance are simplified. Particularly in those methods that use a fluid carrier, because backwashing need not be conducted, stable operation is possible.

In any of the above methods, there are various control factors such as pH and oxidation-reduction potential (ORP) for maintaining the activity of the denitrifying bacteria at a high level, and preparation of the nutritional environment for the denitrifying bacteria may be included as one of those control factors. For example, Patent Document 1 discloses that when treating a water to be treated containing little nutrient salts, minerals, and heavy metals and the like, large amounts of nutrients such as iron (Fe), copper (Cu), molybdenum (Mo), magnesium (Mg), potassium (K) and calcium (Ca) may be added as inorganic substances necessary for the denitrification treatment. Further, Patent Document 2 discloses the addition of iron (Fe), copper (Cu) and molybdenum (Mo) as nutrients for cultivating denitrifying bacteria used with an immobilization carrier.

On the other hand, Patent Documents 1 and 2 only provide general descriptions of the nutrients required for growth of the denitrifying bacteria, make no mention of a specific nutrient maintaining the denitrification activity of the denitrifying bacteria at a high level, and do not clarify the amount required or loading conditions associated with any specific nutrient. Particularly in those cases where the denitrifying bacteria are held on a fluid carrier and form a biofilm, the microorganisms must be grown on the carrier as the apparatus is activated, and therefore a method of maintaining the denitrification activity at a high level is required.

Further, metal salts are typically added in order to supply these nutrients, but if the amount added is excessive, then in some cases, the running costs may increase or a treatment for residual metals may be required.

Examples of typical nutrients in biological treatments include the essential nutrients of nitrogen (N) and phosphorus (P), as well as sulfur (S), potassium (K), sodium (Na), calcium (Ca), magnesium (Mg), iron (Fe), manganese (Mn), cobalt (Co), nickel (Ni), copper (Cu), zinc (Zn), and molybdenum (Mo) and the like.

CITATION LIST

Patent Literature

Patent Document 1: JP 2010-253352 A
Patent Document 2: JP 2012-066164 A

Non-Patent Literature

Non-Patent Document 1: Microbiology nitrate respiration—Genes, enzymes, and environmental distribution, Journal of Biotechnology, 155(2011), pp. 104-117

SUMMARY

Objects of the present disclosure are to provide a water treatment method that includes at least a denitrification step of subjecting a water to be treated to a denitrification treatment by denitrifying bacteria in the presence of a hydrogen donor, wherein the denitrification activity of the denitrifying bacteria can be maintained at a high level and the treatment speed can be increased, and to provide a water treatment apparatus.

The present disclosure provides a water treatment method that includes at least a denitrification step of passing a water to be treated through a biological treatment tank to conduct a denitrification treatment by heterotrophic denitrifying bacteria in the presence of a hydrogen donor, wherein 0.01 to 1.0 mgMo/gN of molybdenum is allowed to be present in the water to be treated, and a carrier is added to the biological treatment tank, with the nitrogen loading relative to the carrier set to equal to or more than 1.6 $kgN/(m^3 \cdot carrier \cdot d)$.

In the water treatment method described above, the molybdenum content in the water to be treated may be changed in accordance with the nitrogen loading in the biological treatment tank.

Further, the present disclosure also provides a water treatment apparatus containing at least a denitrification unit in which a water to be treated is passed through a biological treatment tank to conduct a denitrification treatment by heterotrophic denitrifying bacteria in the presence of a hydrogen donor, wherein 0.01 to 1.0 mgMo/gN of molybdenum is allowed to be present in the water to be treated, and a carrier is added to the biological treatment tank, with the nitrogen loading relative to the carrier set to equal to or more than 1.6 kgN/(m$^3$-carrier·d).

In the water treatment apparatus described above, the molybdenum content in the water to be treated may be changed in accordance with the nitrogen loading in the biological treatment tank.

By using the present disclosure in a water treatment method that includes at least a denitrification step of subjecting a water to be treated to a denitrification treatment by denitrifying bacteria in the presence of a hydrogen donor, the denitrification activity of the denitrifying bacteria can be maintained at a high level, and the treatment speed can be increased.

DESCRIPTION OF EMBODIMENTS

Embodiments of the present disclosure are described below. These embodiments are merely examples of implementing the present disclosure, and the present disclosure is not limited to these embodiments.

Figure 1:
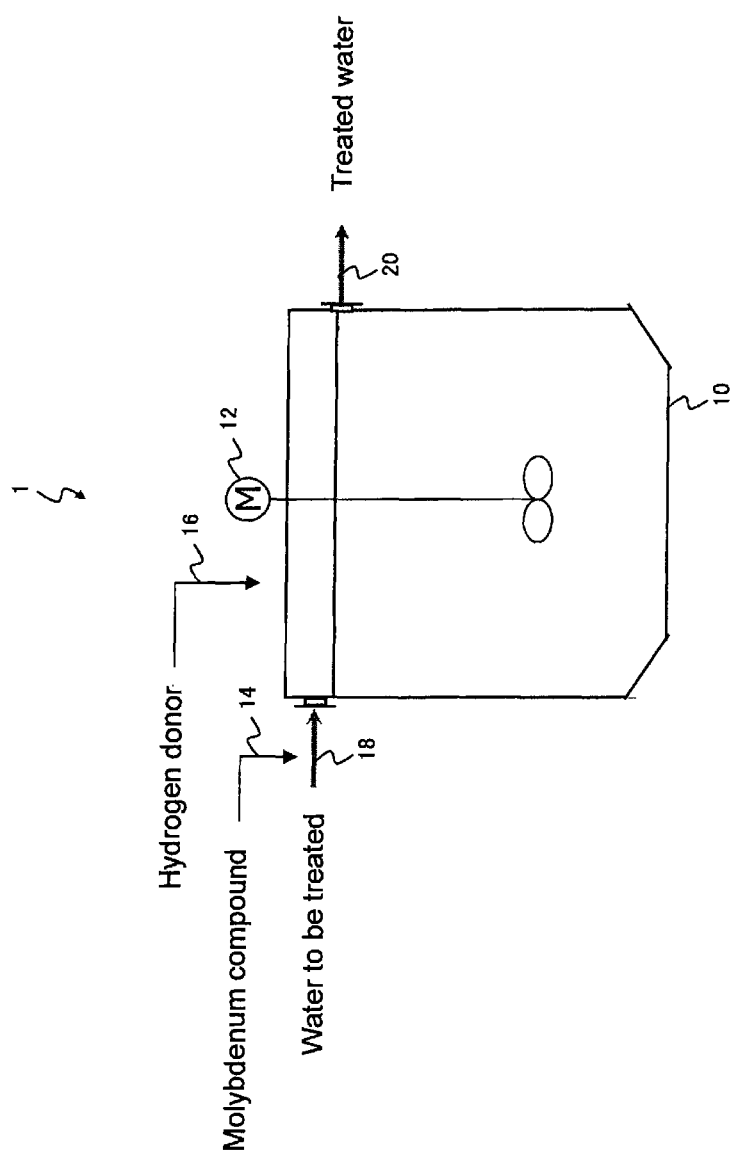
FIG. 1 is a schematic structural diagram illustrating one example of a water treatment apparatus according to an embodiment of the present disclosure.
Figure 2:
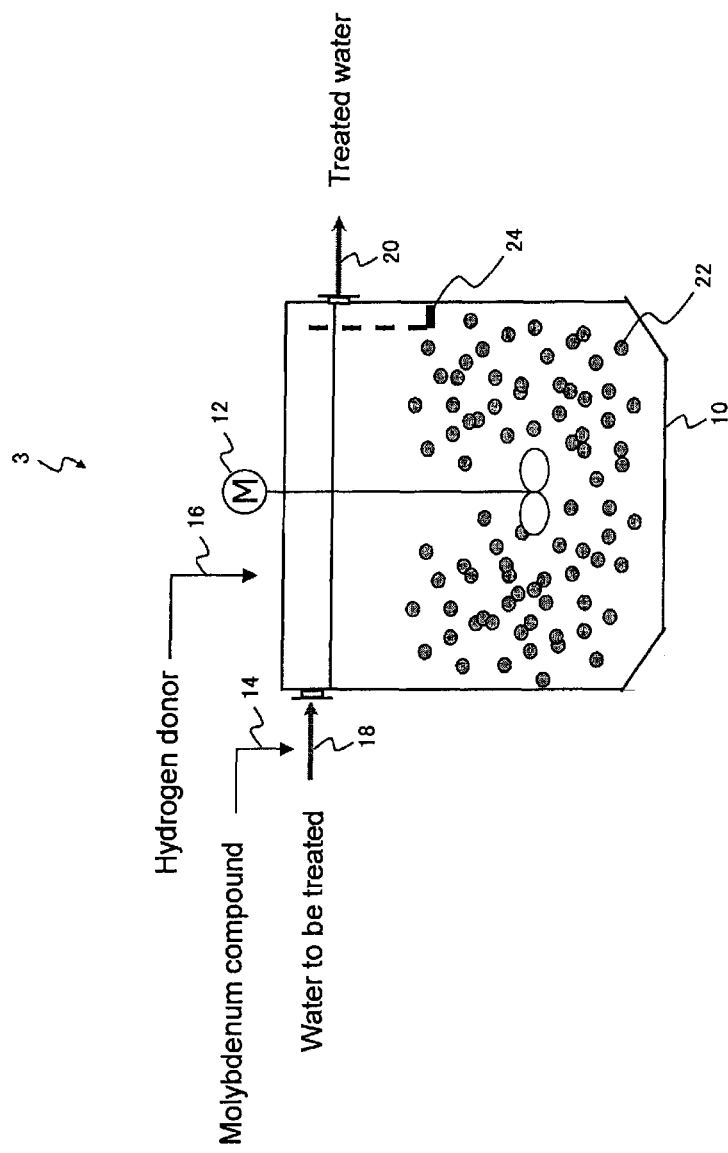
FIG. 2 is a schematic structural diagram illustrating another example of a water treatment apparatus according to an embodiment of the present disclosure.
Figure 3:
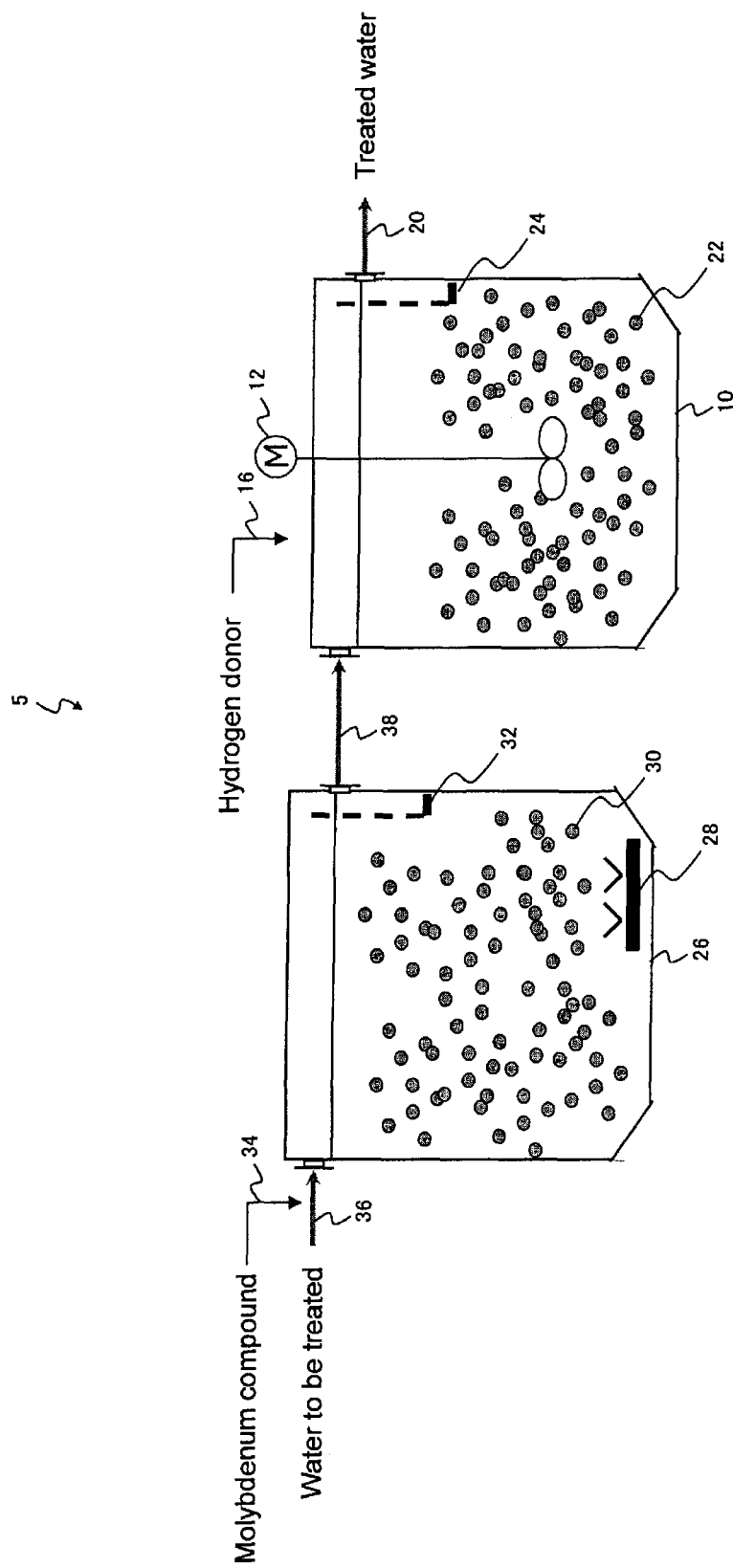
FIG. 3 is a schematic structural diagram illustrating another example of a water treatment apparatus according to an embodiment of the present disclosure.

The outline of one example of a water treatment apparatus according to an embodiment of the present disclosure is illustrated in FIG. 1, and the structure of that device is described below. Further, FIGS. 2 and 3 illustrate other examples of the water treatment apparatus according to embodiments of the present disclosure, which each showing an example of water treatment apparatus that uses a carrier.

The water treatment apparatus 1 contains at least a denitrification unit in which a water to be treated is passed through a biological treatment tank (a denitrification tank) 10 to conduct a denitrification treatment by denitrifying bacteria in the presence of a hydrogen donor, and from 0.01 to 1.0 mgMo/gN of molybdenum is allowed to be present in the water to be treated.

In the water treatment apparatus 1, a water to be treated line 18 is connected to the water to be treated inlet of the biological treatment tank 10, and a treated water line 20 is connected to the treated water outlet. A stirring device 12 having, for example, a rotational drive unit such as a motor and a stirring blade or the like is installed in the biological treatment tank 10 as a stirring unit. A molybdenum compound supply line 14 is connected to the water to be treated line 18, and a hydrogen donor supply line 16 is connected to the biological treatment tank 10.

The water treatment method according to an embodiment of the present disclosure and operation of the water treatment apparatus 1 are described below.

The water to be treated passes through the water to be treated line 18 and is fed into the biological treatment tank 10. In the water to be treated line 18, a molybdenum compound is supplied to the water to be treated through the molybdenum compound supply line 14, so as to from 0.01 to 1.0 mgMo/gN of molybdenum is allowed to be present in the water to be treated (the molybdenum compound supply step). In the biological treatment tank 10, a hydrogen donor is supplied through the hydrogen donor supply line 16, and a denitrification treatment is conducted in which the nitrate nitrogen or nitrite nitrogen is reduced by the denitrifying bacteria in the presence of this hydrogen donor to obtain nitrogen gas (the denitrification step). The denitrified liquid passes through the treated water line 20 and is discharged as a treated water.

The denitrification step is a step, conducted under anaerobic conditions and in the presence of the hydrogen donor, of subjecting at least one of nitrate nitrogen or nitrite nitrogen to a reduction treatment by the denitrifying bacteria to obtain nitrogen gas. In the case where the biological treatment tank 10 employs an upflow system, a recycling line that recycles a portion of the treated water to the water to be treated line 18 may be provided, whereas in the case of a complete mixing system, a stirring device having a rotational drive unit such as a motor and a stirring blade or the like may be provided as a stirring unit. If consideration is given to the ease of pH control, then a complete mixing system may be performed.

In the water treatment method and water treatment apparatus according to embodiments of the present disclosure, by subjecting a water to be treated containing at least one of nitrate nitrogen and nitrite nitrogen to a denitrification treatment by denitrifying bacteria in the presence of molybdenum, the denitrification activity can be maintained at a high level, and the denitrification speed can be increased.

This is due to the following types of reasons. The denitrification reaction by denitrifying bacteria from nitrate to nitrogen gas under anaerobic conditions can be subdivided into [$NO_3^- \to NO_2^- \to NO \to N_2O \to N_2$], and based on Non-Patent Document 1, it is evident that molybdenum participates in the enzyme that catalyzes the reduction reaction [$NO_3^- \to NO_2^-$]. Accordingly, it is assumed that in the denitrification reaction, the nitrification activity can be increased by molybdenum being allowed to be present, although the amount required of the molybdenum and the loading conditions remain unclear regardless of the denitrification method.

The inventors of the present disclosure discovered that in a water treatment method that includes a denitrification step in which a water to be treated containing at least one of nitrate nitrogen and nitrite nitrogen is subjected to a denitrification treatment by denitrifying bacteria in the presence of a hydrogen donor, in cases where the microorganism activity is low and it is difficult to increase the treatment speed, being a prescribed amount of molybdenum allowed to be present in the water to be treated improves the activity of the denitrifying bacteria dramatically, meaning a high treatment speed can be obtained. The inventors also elucidated the loading conditions under which molybdenum is required.

It became clear to the inventors of the present disclosure that the amount of molybdenum required is determined by the nitrogen concentration of the water to be treated that represents the treatment target, and that the amount of molybdenum allowed to be present may be equal to or more than 0.01 mgMo/gN, and in order to avoid excessive addition, may be within a range from 0.01 to 1.0 mgMo/gN, and may be within a range from 0.01 to 0.1 mgMo/gN. If the amount of molybdenum allowed to be present is less than 0.01 mgMo/gN, then the activity of the denitrifying bacteria is low, and the reaction tank volume required for the treatment increases. There are no particular limitations on the nitrogen concentration of the water to be treated that represents the treatment target, and a typical amount is equal to or more than 10 mgN/L, or within a range from 10 to 5,000 mgN/L. For example, in the case of a nitrogen concentration of 10 mgN/L, the required concentration of molybdenum is within a range from 0.0001 to 0.01 mgMo/L. Within this range, the molybdenum content in the water to be treated may be changed in accordance with the nitrogen loading in the biological treatment tank 10 to determine the final amount added.

In the water treatment method and water treatment apparatus according to embodiments of the present disclosure, in those cases where the nitrogen loading in the biological treatment tank 10 is set to equal to or more than 0.16 kgN/($m^3$-tank volume·d), the treatment performance improves. From the viewpoints of installation area and cost and the like, the nitrogen loading in the biological treatment tank 10 may be set to equal to or more than 1.0 kgN/($m^3$-tank volume·d). Although there are no particular limitations on the upper limit for the nitrogen loading in the biological treatment tank 10, the nitrogen loading is, for example, typically not more than 10 kgN/($m^3$-tank volume·d), and may be 5.0 kgN/($m^3$-tank volume·d) or less.

In embodiments of the present disclosure, the water to be treated that represents the treatment target is, for example, a nitrogen-containing water that contains at least one of nitrate nitrogen and nitrite nitrogen. Nitrogen-containing water that also contains ammonium nitrogen also exists, but a nitrogen-containing water that contains ammonium nitrogen as the main component may be treated under aerobic conditions with ammonia-oxidizing bacteria and nitrite-oxidizing bacteria or the like to nitrify the ammonium ions to nitrite ions and nitrate ions, with the resulting water then used as the water to be treated of the treatment target.

Examples of the water to be treated include industrial wastewater such as electronic industry wastewater, metallurgical plant wastewater and power plant wastewater, as well as wastewater containing digestion release water discharged during a sludge treatment process. Electronic industrial wastewater contains various chemicals, and the components of the wastewater differ considerably depending on the products being produced, but examples of nitrogen-containing water include the wastewater from wafer cleaning. This wastewater contains ammonia, and frequently also contains tetramethylammonium hydroxide (TMAH), hydrogen peroxide, fluoride ions, and isopropyl alcohol (IPA) and the like.

The molybdenum concentration in the water to be treated is, for example, less than 0.0001 mgMo/L.

In those cases where the amount of molybdenum contained in the water to be treated is insufficient, the treatment performance is improved by adding a molybdenum compound from externally. The molybdenum compound may be added, for example, in the form of a molybdenum compound solution, and supplied to the water to be treated through the molybdenum compound supply line 14, with the water to be treated containing the mixed molybdenum compound then supplied to the treatment system.

Examples of the molybdenum compound include molybdate compounds such as sodium molybdate, potassium molybdate and ammonium molybdate. There are no particular limitations on the form of the molybdenum compound, but a solution state is more readily utilizable by the bacteria in the microbial sludge, and for example, preparation in advance of an aqueous solution of sodium molybdate or potassium molybdate or the like, and then addition of this aqueous solution may be made.

In terms of the location at which the molybdenum compound is added, the molybdenum compound may be supplied to the water to be treated line 18 through which the water to be treated flows into the biological treatment tank 10, or a tank for temporarily storing the water to be treated may be provided separately, with the molybdenum compound then supplied to this tank.

For the hydrogen donor, organic matter or the like contained in the water to be treated may be utilized, but in those cases where the amount of hydrogen donor is insufficient, a hydrogen donor may be supplied from externally. In such a case, the amount supplied of the hydrogen donor may be determined, for example, from the nitrogen concentration in the water to be treated and the volume of water, and the hydrogen donor may then be added continuously based on this supply amount. Examples of hydrogen donors that may be supplied from externally include one or a plurality of compounds selected from among alcohols such as methanol, ethanol and isopropyl alcohol, organic acids such as acetic acid, and hydrogen gas, acetone, glucose, ethyl methyl ketone and tetramethylammonium hydroxide (TMAH), but this is not an exhaustive list, and any conventional compound used as a hydrogen donor may be used.

The water temperature in the biological treatment tank 10 may be maintained for example within a range from 15 to 40° C.

In those cases where the pH of the denitrified liquid increases as the reduction in the biological treatment tank 10 progresses, an acid such as hydrochloric acid or sulfuric acid may be added to maintain the pH within a range from 6.0 to 8.5.

By introducing a carrier into the biological treatment tank 10, and holding the denitrifying bacteria on the carrier, the contact efficiency between at least one of nitrate nitrogen and nitrite nitrogen and the denitrifying bacteria can be improved, and therefore high-loading operation becomes possible, and control of the sludge containing the denitrifying bacteria is simplified.

An example of a water treatment apparatus having this type of structure is illustrated in FIG. 2. In the water treatment apparatus 3 of FIG. 2, a carrier 22 is introduced into the biological treatment tank 10. The biological treatment tank 10 is provided with a screen 24 to inhibit outflow of the carrier 22 into the treated water line 20.

There are no particular limitations on the carrier 22, and any carrier conventionally used under anaerobic conditions may be used, including plastic carriers, sponge-like carriers and gel-like carriers. In particular, by using a gel-like carrier as a fluid carrier, floating of the carrier caused by nitrogen gas can be suppressed, and because the fluidity of the carrier upon stirring is also high, treatment can be conducted at a higher loading compared with plastic carriers and sponge-like carriers. There are no particular limitations on the gel-like carriers, and examples include water-absorbent polymer gel-like carriers containing polyvinyl alcohol, polyethylene glycol, or polyurethane or the like. Further, examples of the method used for retaining the sludge on the carrier include a method in which the sludge is inclusively immobilized within the interior of the carrier in advance, and a method in which the carrier and a seed sludge are introduced into the biological treatment tank (the denitrification tank) and a biofilm is formed on the carrier, and in terms of increasing the contact efficiency with the water to be treated and maintaining a high level of activity, the method in which a biofilm is formed on the carrier may be performed.

Although there are no particular limitations on the shape of the carrier 22, the shape of the carrier 22 may be a spherical shape, cubic shape, rectangular parallelepiped shape, or circular cylindrical shape or the like of about 1 mm to 10 mm. The carrier 22 may be a spherical or circular cylindrical gel-like carrier of about 3 to 8 mm. In order to facilitate formation of a fluid state inside the biological treatment tank 10, the specific gravity of the carrier 22 may be at least greater than 1.0, equal to or more than 1.1 with the true specific gravity, or at least 1.01 with the apparent specific gravity.

The stirring method employed in those cases where a carrier method is used may involve installing a draft tube, which is open at the top and bottom, in a substantially vertical arrangement inside the biological treatment tank 10, and then using a vertical stirrer or underwater aerator to form a downward flow inside the draft tube and an upward flow outside the draft tube.

The amount of the carrier 22 introduced into the biological treatment tank 10 may be within a range from 10 to 70% relative to the volume of the biological treatment tank 10. If the amount introduced of the carrier 22 is less than 10% relative to the volume of the biological treatment tank 10, then the reaction rate may sometimes decrease, whereas if the amount exceeds 70%, then the carrier fluidity may sometimes deteriorate, and short pass of the water to be treated caused by sludge blockages during long-term operation and a deterioration in water quality may sometimes occur.

The nitrogen loading per carrier volume at which molybdenum is required in the denitrification step of the carrier method has been clarified by the inventors of the present disclosure, and when the loading is 1.6 kgN/(m$^3$-carrier·d) or greater, the treatment performance can be improved by introducing molybdenum, which is desirable. As illustrated in Table 1, in the case where, for example, the carrier filling ratio in the biological treatment tank 10 is 10%, the treatment performance improves for those cases where the nitrogen loading is 0.16 kgN/(m$^3$-tank volume·d) or greater.

TABLE 1

Volumetric loading at which treatment performance improves in the presence of molybdenum for various filling ratios in the denitrification tank

| Carrier filling ratio (%) | Nitrogen volumetric loading at which treatment performance improves in the presence of molybdenum (kgN/(m$^3$-tank volume · d)) |
|---|---|
| 10 | 0.16 or greater |
| 20 | 0.32 or greater |
| 30 | 0.48 or greater |
| 40 | 0.64 or greater |
| 50 | 0.80 or greater |
| 60 | 0.96 or greater |
| 70 | 1.12 or greater |

In the case of a water to be treated in which the main component is ammonium nitrogen, treatment may be conducted by providing, at upstream of the biological treatment tank 10, a nitrification tank or the like for nitrifying the ammonium ions with ammonia-oxidizing bacteria and nitrite-oxidizing bacteria and the like under aerobic conditions to obtain nitrite ions or nitrate ions.

An example of a water treatment apparatus having this type of structure is illustrated in FIG. 3. The water treatment apparatus 5 of FIG. 3 includes a nitrification tank 26 as a nitrification unit for nitrifying ammonium ions with ammonia-oxidizing bacteria and nitrite-oxidizing bacteria and the like under aerobic conditions to obtain nitrite ions or nitrate ions, and a denitrification unit in which the nitrified liquid obtained in the nitrification flows into the biological treatment tank (the denitrification tank) 10, and a nitrification treatment is conducted by denitrifying bacteria in the presence of a hydrogen donor.

In the water treatment apparatus 5, a water to be treated line 36 is connected to the water to be treated inlet of the nitrification tank 26, the nitrified liquid outlet of the nitrification tank 26 and the nitrified liquid inlet of the biological treatment tank 10 are connected by a nitrified liquid line 38, and the treated water line 20 is connected to the treated water outlet of the biological treatment tank 10. A molybdenum compound supply line 34 is connected to the water to be treated line 36. A stirring device 12 having, for example, a rotational drive unit such as a motor and a stirring blade or the like is installed in the biological treatment tank 10 as a stirring unit. The hydrogen donor supply line 16 is connected to the biological treatment tank 10. A carrier 30 is introduced into the nitrification tank 26. The nitrification tank 26 is provided with a screen 32 to inhibit outflow of the carrier 30 into the nitrified liquid line 38, and also has an aeration device 28 as an oxygen-containing gas supply unit for supplying an oxygen-containing gas. The carrier 22 is introduced into the biological treatment tank 10. The biological treatment tank 10 is provided with the screen 24 to inhibit outflow of the carrier 22 into the treated water line 20.

In the water treatment apparatus 5, the water to be treated passes through the water to be treated line 36 and is fed into the nitrification tank 26. A molybdenum compound is supplied to the water to be treated in the water to be treated line 36 through the molybdenum compound supply line 34, so as to from 0.01 to 1.0 mgMo/gN of molybdenum is allowed to be present in the water to be treated (the molybdenum compound supply step). In the nitrification tank 26, the ammonium ions are nitrified with ammonia-oxidizing bacteria and nitrite-oxidizing bacteria and the like under aerobic conditions to obtain nitrite ions or nitrate ions (the nitrification step).

The nitrified liquid (which functions as the water to be treated in the biological treatment tank 10) passes through the nitrified liquid line 38 and is fed into the biological treatment tank 10. In the biological treatment tank 10, the hydrogen donor is supplied through the hydrogen donor supply line 16, and a denitrification treatment is conducted in which the nitrate nitrogen or nitrite nitrogen is reduced by the denitrifying bacteria in the presence of this hydrogen donor to obtain nitrogen gas (the denitrification step). The denitrified liquid passes through the treated water line 20 and is discharged as a treated water.

In terms of the location at which the molybdenum compound is added, the molybdenum compound may be supplied to the water to be treated line 36 through which the water to be treated flows into the nitrification tank 26, or a tank for temporarily storing the water to be treated may be provided separately, with the molybdenum compound then supplied to this tank.

In order to hold the ammonia-oxidizing bacteria and nitrite-oxidizing bacteria and the like inside the nitrification tank 26, a carrier 30 may be introduced. There are no particular limitations on the carrier 30 used in such cases, and any carrier conventionally used under aerobic conditions may be used, including plastic carriers, sponge-like carriers and gel-like carriers.

The method used for holding the ammonia-oxidizing bacteria, nitrite-oxidizing bacteria, and denitrifying bacteria and the like is not limited to the fluid bed method, and any other method such as a fixed bed method, flotation method, membrane separation activated sludge method or USB method may also be used. Further, in the flotation method and the membrane separation activated sludge method and the like, in order to hold larger amounts of the ammonia-oxidizing bacteria, nitrite-oxidizing bacteria, and denitrifying bacteria and the like inside the tank, a carrier may also be used. In order to treat the residual organic matter from the denitrification step, an oxidation step may be provided after the denitrification step.

EXAMPLES

The present disclosure is described below in more specific detail using a series of examples and comparative examples, but the present disclosure is in no way limited by the following examples.

Examples and comparative examples using a continuous water flow tester are described below.

All examples were conducted under controlled conditions with the room temperature at 20° C.±2.0° C. and the pH at 7.0 to 7.5. Further, the test results were obtained for soluble water to be treated and treated water that had been filtered through a 0.45 μm filter.

Comparative Example 1 and Example 1

Denitrification tests of a simulated wastewater were conducted using the water treatment apparatus employing the carrier method illustrated in FIG. 2.

[Test Conditions]
Biological treatment tank volume: 1.4 L
Microorganism-holding carrier: polyvinyl alcohol gel-like carrier (spherical, diameter: 4 mm)
Carrier filling ratio: 20%, 40%, 60% (carrier bulk volume/tank volume)
Test water: a simulated wastewater was prepared by adding sodium nitrate equivalent to a nitrate nitrogen concentration of 300 mg/L to well water, and then adding phosphoric acid and a trace elements solution. The trace elements solution used in these tests contained no molybdenum, nickel or cobalt. The concentrations of molybdenum, nickel and cobalt in the simulated wastewater were each less than 0.0001 mg/L. The concentrations of trace elements in the simulated wastewater are shown in Table 2. These concentrations of trace elements were measured using ICP mass spectrometry (ICP-MS).
Hydrogen donor: methanol
Seed sludge: a denitrification sludge that had been acclimatized with methanol was added at an MLSS concentration of 1,000 mg/L.

TABLE 2

Concentrations of trace elements in simulated wastewater

| K | mg/L | 4.2 |
| Mg | mg/L | 11 |
| Ca | mg/L | 25 |
| Cu | mg/L | 0.31 |
| Zn | mg/L | 0.44 |
| Mn | mg/L | 0.39 |
| Fe | mg/L | 1.8 |
| Na | mg/L | 9.4 |
| S | mg/L | 4.4 |
| Mo | mg/L | less than 0.0001 |
| Co | mg/L | less than 0.0001 |
| Ni | mg/L | less than 0.0001 |

[Test Results]

Figure 4:
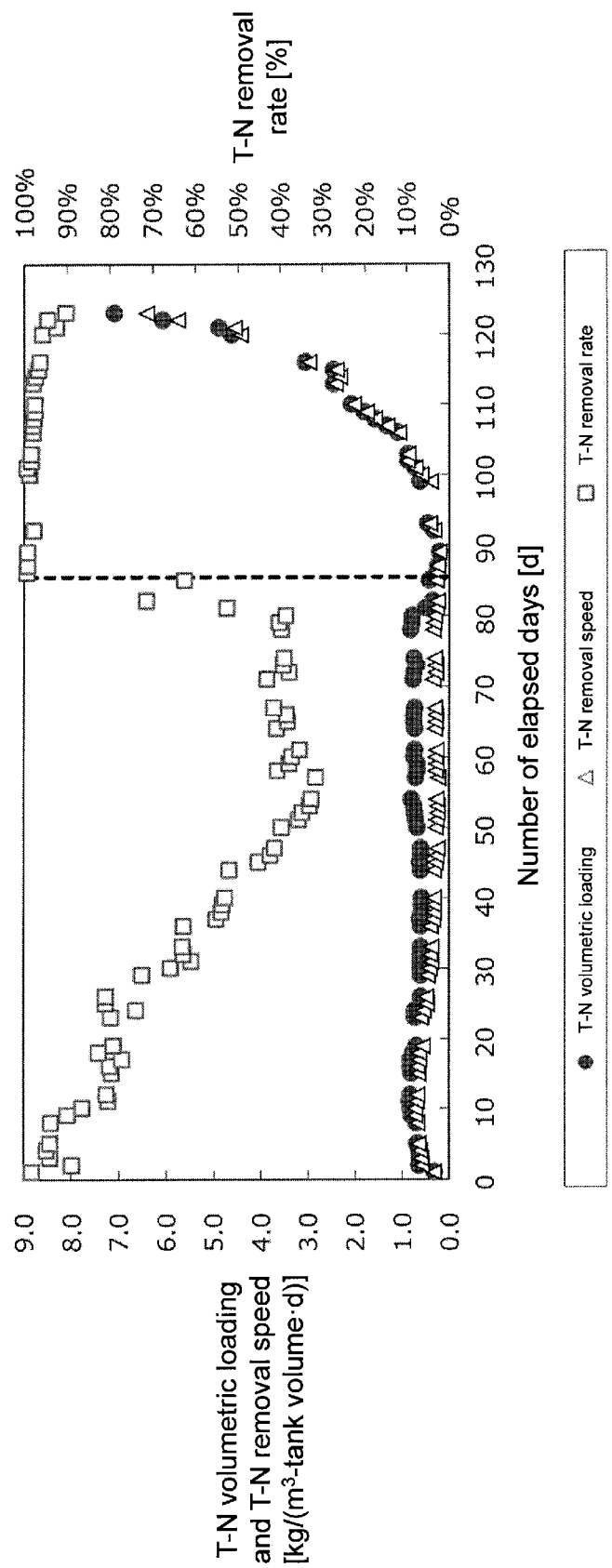
FIG. 4 is a graph illustrating the results for a filling ratio of 20% in Comparative Example 1 and Example 1.
Figure 5:
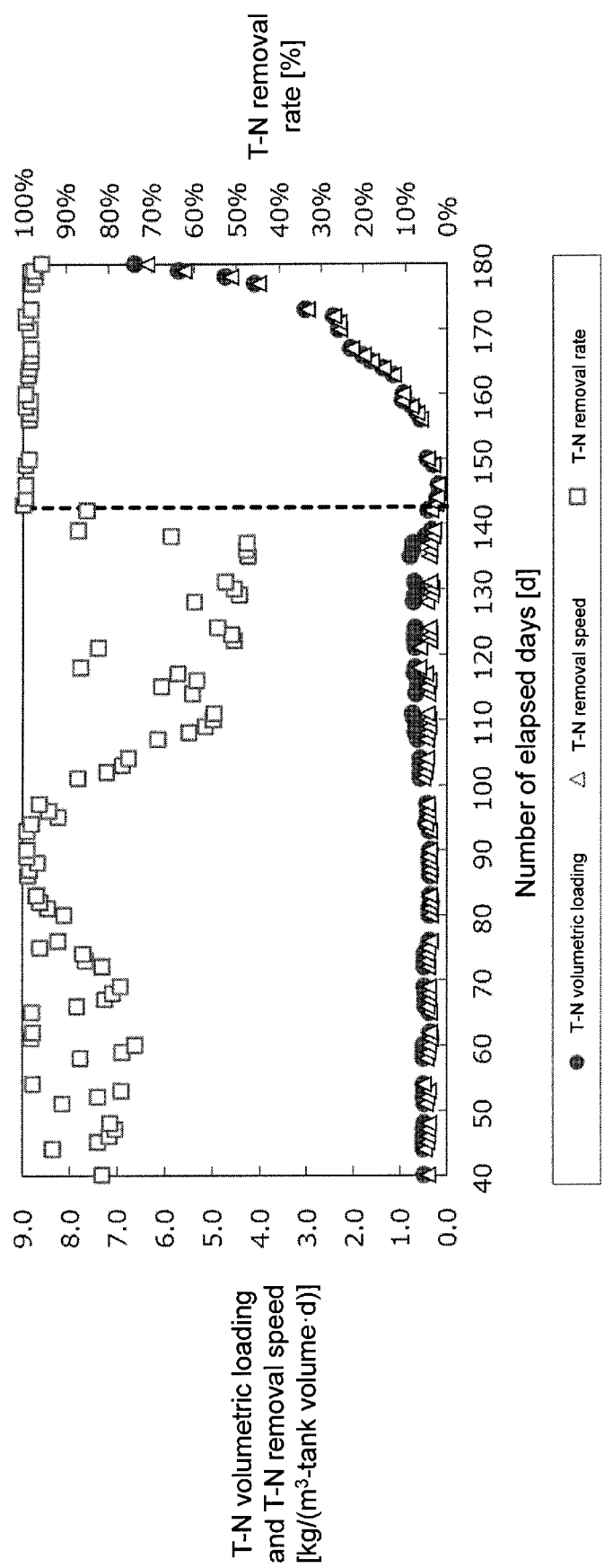
FIG. 5 is a graph illustrating the results for a filling ratio of 40% in Comparative Example 1 and Example 1.
Figure 6:
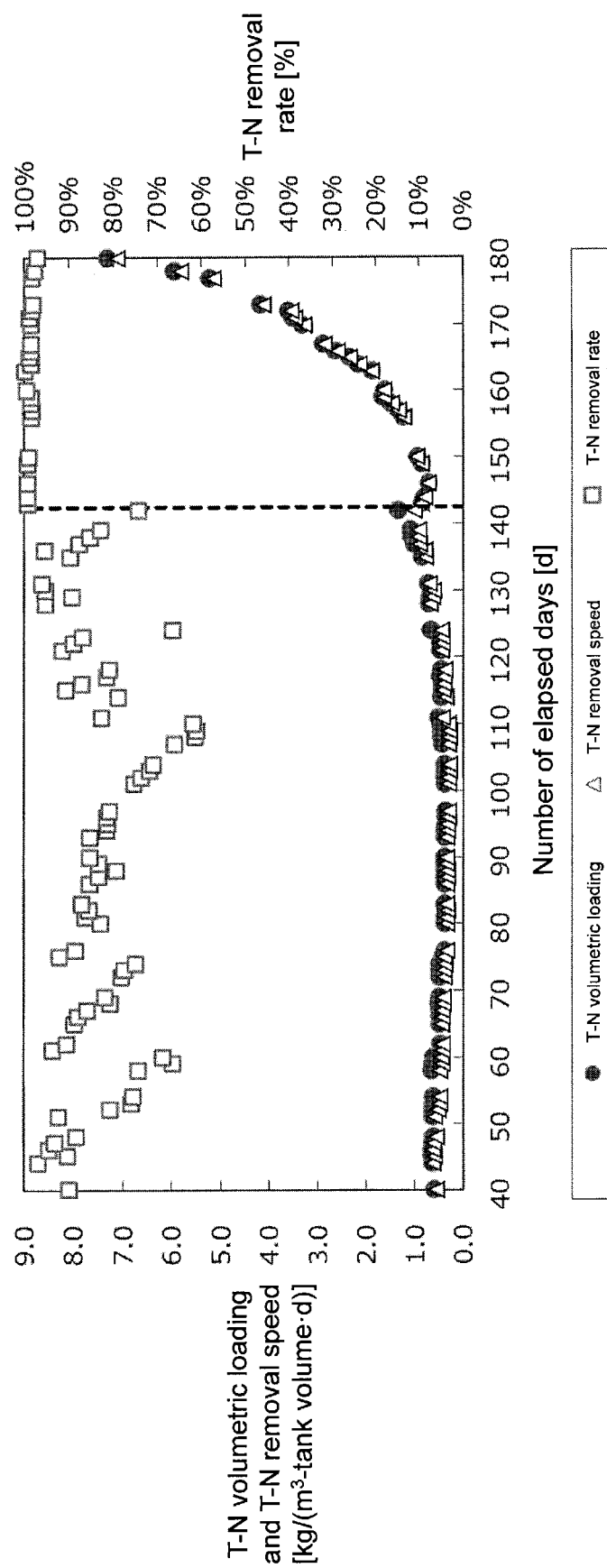
FIG. 6 is a graph illustrating the results for a filling ratio of 60% in Comparative Example 1 and Example 1.

The results for a filling ratio of 20% are shown in FIG. 4, the results for a filling ratio of 40% are shown in FIG. 5, and results for a filling ratio of 60% are shown in FIG. 6.

Comparative Example 1 Operating Period: Filling Ratio 20%:Up to Day 85, Filling Ratio 40% and 60%:Up to Day 142

In terms of the T-N (total nitrogen) volumetric loading, water flow was started at 0.3 kgN/(m$^3$-tank volume·d) at a filling ratio of 20%, at 0.5 kgN/(m$^3$-tank volume·d) at a filling ratio of 40%, or at 0.6 kgN/(m$^3$-tank volume·d) at a filling ratio of 60%. For the filling ratio of 20% and the filling ratio of 40%, the T-N volumetric loading was increased to about 1.0 kgN/(m$^3$-tank volume·d), and for the filling ratio of 60%, the T-N volumetric loading was increased to about 1.3 kgN/(m$^3$-tank volume·d), but the T-N removal rate tended to decrease, and the treatment performance was unstable. During this period, the maximum T-N removal speed was 0.33 kgN/(m$^3$-tank volume·d) at a filling ratio of 20%, 0.59 kgN/(m$^3$-tank volume·d) at a filling ratio of 40%, and 1.00 kgN/(m$^3$-tank volume·d) at a filling ratio of 60%.

Example 1 Operating Period: Filling Ratio 20%:Day 86 Onward, Filling Ratio 40% and 60: Day 143 Onward Subsequently, from day 86 in the case of a filling ratio of 20%, and from day 143 in the case of a filling ratio of 40% or 60%, a molybdenum compound, a nickel compound and a cobalt compound were added to adjust the concentrations of molybdenum, nickel and cobalt in the simulated wastewater to 0.257 mgMo/L, 0.220 mgNi/L and 0.216 mgCo/L respectively, and water flow was continued. The ratios of these elements relative to the nitrogen concentration of the water to be treated represented conditions of 0.857 mgMo/gN, 0.733 mgNi/gN and 0.720 mgCo/gN respectively.

When the addition of molybdenum, nickel and cobalt was started at the amounts listed above, the treatment performance improved rapidly, and the T-N removal rate increased to equal to or more than 97%. Further, the T-N removal speed also displayed an increasing trend, and in each case, within 40 days of starting the addition of molybdenum, nickel and cobalt, the T-N removal speed had reached 6.0 kgN/(m$^3$-tank volume·d) or higher.

The T-N removal speeds per carrier volume in Comparative Example 1 and Example 1 are shown in Table 3.

TABLE 3

T-N removal speeds pre carrier volume
in Comparative Example 1 and Example 1

|  | Carrier filling ratio 20% | Carrier filling ratio 40% | Carrier filling ratio 60% |
|---|---|---|---|
| Comparative Example 1 Maximum T-N removal speed for carrier (kgN/(m³-carrier · d)) | 1.65 | 1.48 | 1.67 |
| Example 1 Maximum T-N removal speed for carrier (kgN/(m³-carrier · d)) | 32.1 | 15.9 | 18.4 |
| Example 1/ Comparative Example 1 | 19 | 11 | 11 |

The maximum T-N removal speed per carrier volume in the period of Comparative Example 1 (excluding the startup period) was 1.65 kgN/(m³-carrier·d) at a filling ratio of 20%, 1.48 kgN/(m³-carrier·d) at a filling ratio of 40%, and 1.67 kgN/(m³-carrier·d) at a filling ratio of 60%, with the average of these values being 1.60 kgN/(m³-carrier·d).

In contrast, in the period of Example 1, addition of the molybdenum compound, nickel compound and cobalt compound significantly increased the T-N removal speed per carrier volume, with the maximum T-N removal speed during the water flow period increasing equal to or more than 10-fold, and a T-N removal speed per carrier volume of equal to or more than 1.60 kgN/(m³-carrier·d) was able to be obtained.

Example 2

Figure 7:
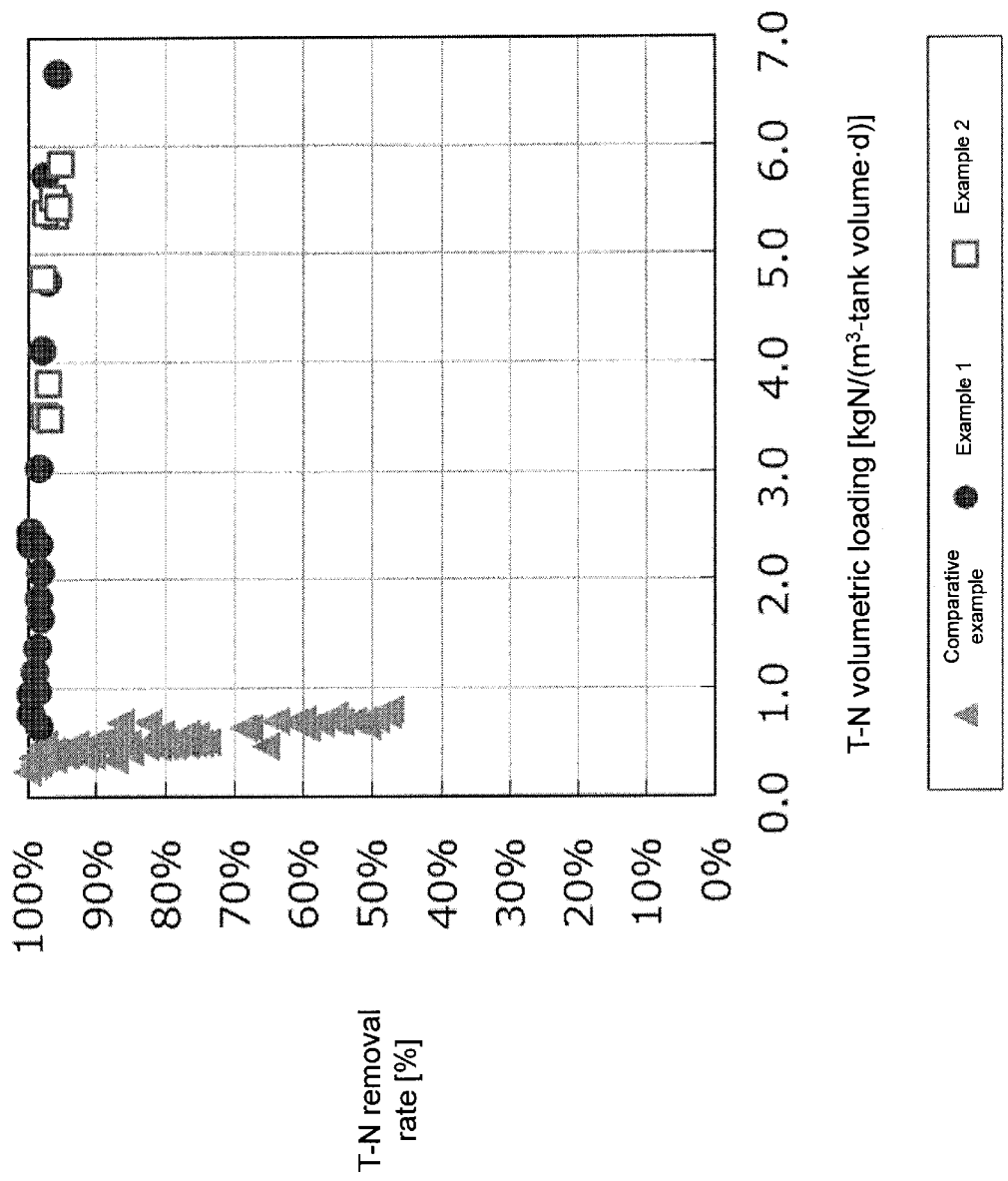
FIG. 7 is a graph illustrating the results of Example 2.

In the test of Example 1 with the filling ratio at 40%, addition of the molybdenum, nickel and cobalt was stopped, and continuous water flow was continued (with the concentrations of molybdenum, nickel and cobalt in the simulated wastewater each less than 0.0001 mg/L). Subsequently, once the T-N removal speed was confirmed as having fallen by about one half, addition of the molybdenum compound was started so as to achieve a molybdenum concentration of 0.0075 mgMo/L. The ratio relative to the nitrogen concentration of the water to be treated represented by a condition of 0.025 mgMo/gN. The results are shown in FIG. 7.

Following the molybdenum addition, the treatment performance improved in a similar manner to that observed in Example 1, and a T-N removal rate of equal to or more than 95% was obtained within a T-N volumetric loading range of 3.5 to 6.0 kgN/(m³-tank volume·d), meaning similar treatment performance was obtained to that of Example 1 in which molybdenum, nickel and cobalt were added.

Example 3

Figure 8:
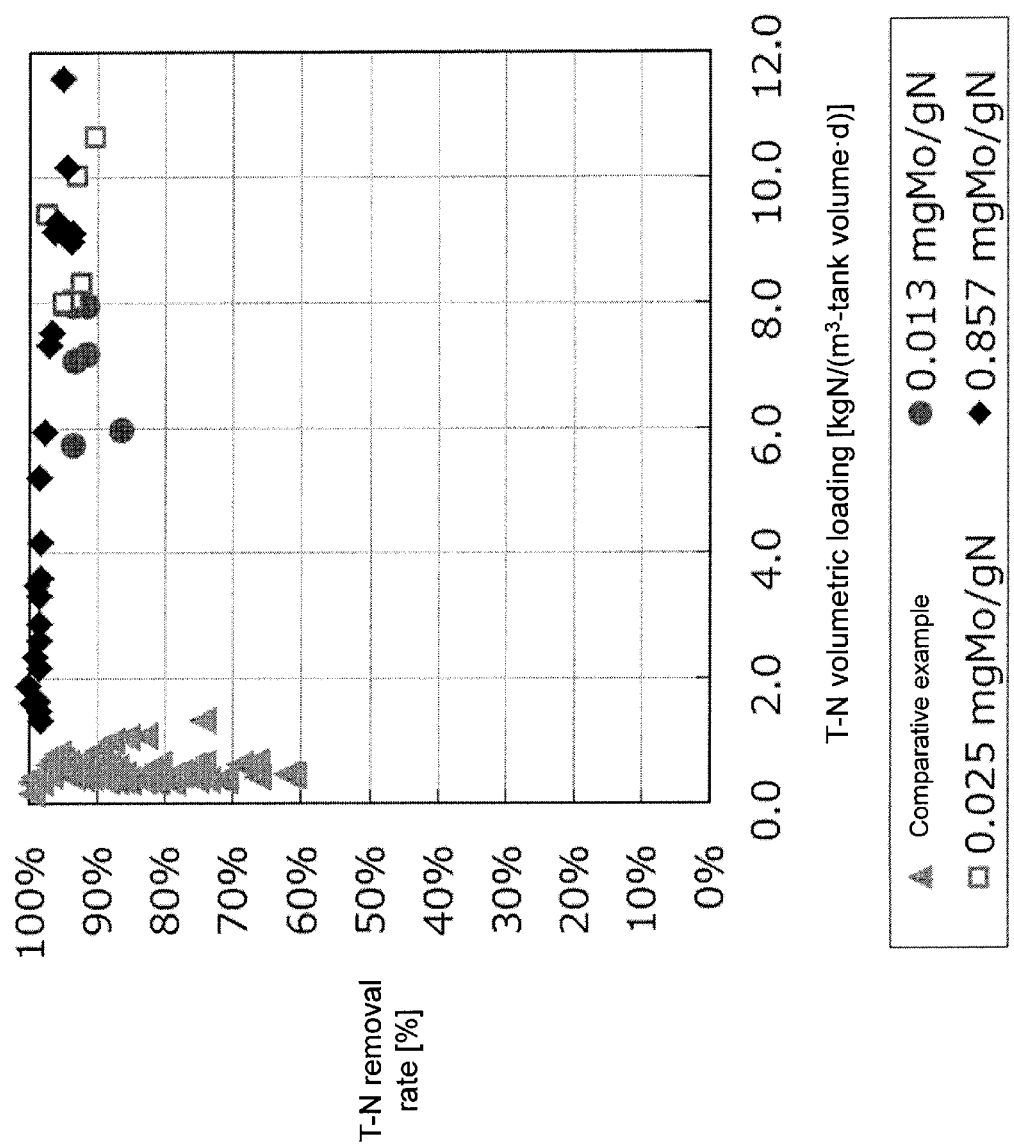
FIG. 8 is a graph illustrating the results of Example 3.

In the test of Example 1 with the filling ratio at 60%, addition of the molybdenum, nickel and cobalt was stopped, and continuous water flow was continued (with the concentrations of molybdenum, nickel and cobalt in the simulated wastewater each less than 0.0001 mg/L). Subsequently, once the T-N removal speed was confirmed as having fallen to about 30%, in order to investigate the effect of the amount added of molybdenum, addition of the molybdenum compound was started so as to achieve a molybdenum concentration of 0.004 mgMo/L, 0.0075 mgMo/L, or 0.257 mgMo/L, and the results were compared. The ratios relative to the nitrogen concentration of the water to be treated represented conditions of 0.013 mgMo/gN, 0.025 mgMo/gN and 0.857 mgMo/gN respectively. The results are shown in FIG. 8. In FIG. 8, the numerical values for 0.857 mgMo/gN at T-N volumetric loadings of 8 kgN/(m³-tank volume·d) or lower are the results from Example 1.

At 0.013 mgMo/gN, under T-N volumetric loading conditions of about 6 to 8 kgN/(m³-tank volume·d), the T-N removal rate was 87 to 94%, and the T-N removal speed reached 7.5 kgN/(m³-tank volume·d). Under conditions of 0.025 mgMo/gN or 0.857 mgMo/gN, similar treatment performance was obtained even under T-N volumetric loading conditions of 10 kgN/(m³-tank volume·d).

As described above, by employing the method described in the examples in a water treatment method that includes at least a denitrification step of subjecting a water to be treated to a denitrification treatment by denitrifying bacteria in the presence of a hydrogen donor, the denitrification activity of the denitrifying bacteria can be maintained at a high level and the treatment speed can be increased.

REFERENCE SIGNS LIST 1, 3, 5: Water treatment apparatus
10: Biological treatment tank
12: Stirring device
14, 34: Molybdenum compound supply line
16: Hydrogen donor supply line
18, 36: Water to be treated line
20: Treated water line
22, 30: Carrier
24, 32: Screen
26: Nitrification tank
28: Aeration device
38: Nitrified liquid line

The invention claimed is:

1. A water treatment method comprising at least denitrifying that passes a water to be treated through a biological treatment tank to conduct a denitrification treatment by heterotrophic denitrifying bacteria in presence of a hydrogen donor, wherein
   0.01 to 1.0 mgMo/gN of molybdenum is allowed to be present in the water to be treated, and
   a carrier is added to the biological treatment tank, with a nitrogen loading relative to the carrier set to equal to or more than 1.6 kgN/(m³-carrier·d).

2. The water treatment method as claimed in claim 1, wherein
   a molybdenum content in the water to be treated is changed in accordance with a nitrogen loading in the biological treatment tank.

3. A water treatment apparatus comprising
   at least a denitrification unit in which a water to be treated is passed through a biological treatment tank to conduct a denitrification treatment by heterotrophic denitrifying bacteria in presence of a hydrogen donor,
   a first supply line configured to supply water to be treated, the first supply line being connected to an inlet of the biological treatment tank, and
   a second supply line configured to supply molybdenum, the second supply line being connected to the first supply line prior to the inlet of the biological treatment tank,
   wherein the second supply line is further configured to supply 0.01 to 1.0 mgMo/gN of molybdenum to the first supply line, and wherein a carrier is added to the biological treatment tank, with a nitrogen loading relative to the carrier set to equal to or more than 1.6 kgN/($m^3$-carrier·d).

4. The water treatment apparatus as claimed in claim 3, wherein the second supply line is further configured to change a molybdenum content in the first supply line in accordance with a nitrogen loading in the biological treatment tank.

* * * * *